United States Patent
Gulrajani (10) Patent No.: US 11,832,696 B2
(45) Date of Patent: Dec. 5, 2023

(54) LUGGAGE WHEEL ASSEMBLY

(71) Applicant: IT LUGGAGE LIMITED, Hertford (GB)

(72) Inventor: Paul Gulrajani, Hertford (GB)

(73) Assignee: it Luggage Limited, Hertford (GB)

( * ) Notice: Subject to any disclaimer, the term of this patent is extended or adjusted under 35 U.S.C. 154(b) by 739 days.

(21) Appl. No.: 16/965,660

(22) PCT Filed: Feb. 6, 2019

(86) PCT No.: PCT/EP2019/052919
§ 371 (c)(1),
(2) Date: Jul. 29, 2020

(87) PCT Pub. No.: WO2019/154864
PCT Pub. Date: Aug. 15, 2019

(65) Prior Publication Data
US 2021/0037934 A1   Feb. 11, 2021

(30) Foreign Application Priority Data
Feb. 6, 2018   (GB) ..................................... 1801927

(51) Int. Cl.
*B60B 33/00* (2006.01)
*A45C 5/14* (2006.01)
*B60B 33/08* (2006.01)

(52) U.S. Cl.
CPC ............ *A45C 5/14* (2013.01); *B60B 33/0042* (2013.01); *B60B 33/08* (2013.01);
(Continued)

(58) Field of Classification Search
CPC . B60B 33/00; B60B 33/0028; B60B 33/0042; B60B 33/08; B60B 2200/45; A45C 5/14; A45C 2005/142
(Continued)

(56) References Cited

U.S. PATENT DOCUMENTS

| 3,040,370 A |   | 6/1962 | Ford |
| 5,119,525 A | * | 6/1992 | Melara ................ B60B 33/0042 16/31 R |

(Continued)

FOREIGN PATENT DOCUMENTS

| GB | 2091090 | 7/1982 |
| GB | 2133978 | 8/1984 |

OTHER PUBLICATIONS

PCT Search Report and Written Opinion prepared for PCT/EP2019/052919, completed May 3, 2019.
(Continued)

*Primary Examiner* — Roberta S Delisle
(74) *Attorney, Agent, or Firm* — Barnes & Thornburg LLP (57) ABSTRACT

Embodiments of the present disclosure relate to a wheel assembly (104) for an article of luggage, such as a suitcase (100). The wheel assembly (104) comprises: a central support element (200); a first wheel (132) rotatably attached to the central support element (200); a second wheel (134) rotatably attached to the central support element (200) on an opposing side to the first wheel (132), wherein the first wheel (132) and the second wheel (134) share a common axis of rotation X; and wherein each of the first wheel (132) and the second wheel (134) are substantially hemispherical in shape.

21 Claims, 7 Drawing Sheets

(52) U.S. Cl.
CPC ......... *A45C 2005/142* (2013.01); *B60B 33/00* (2013.01); *B60B 2200/45* (2013.01)

(58) Field of Classification Search
USPC .......................... 16/18 R, 24, 26, 27, 45, 47
See application file for complete search history.

(56) References Cited

U.S. PATENT DOCUMENTS

| | | | |
|---|---|---|---|
| 6,070,701 A * | 6/2000 | Hu | A47D 13/043 |
| | | | 280/87.051 |
| 6,256,835 B1 * | 7/2001 | Wang | B60B 33/0049 |
| | | | 16/35 R |
| 6,637,072 B2 | 10/2003 | Footitt et al. | |
| 6,748,623 B1 * | 6/2004 | Tsai | B60B 7/061 |
| | | | 16/45 |
| 7,647,673 B2 * | 1/2010 | Melara | B60B 33/001 |
| | | | 16/45 |
| 9,340,069 B1 * | 5/2016 | Cheng | B60B 33/0028 |
| 2004/0181907 A1 | 9/2004 | Lee | |
| 2008/0276427 A1 | 11/2008 | Schioppa | |
| 2011/0227304 A1 | 9/2011 | Lai et al. | |
| 2013/0326844 A1 * | 12/2013 | Stoehr | B60B 27/001 |
| | | | 16/18 R |
| 2015/0047148 A1 * | 2/2015 | Melara | B60B 33/021 |
| | | | 16/47 |
| 2015/0113766 A1 * | 4/2015 | Hou | A45C 5/14 |
| | | | 16/45 |
| 2017/0000228 A1 * | 1/2017 | Oh | A45C 5/03 |
| 2017/0000233 A1 * | 1/2017 | Scicluna | A45C 5/14 |

OTHER PUBLICATIONS

United Kingdom Examination and Search Report for GB1801927.3, completed Jun. 21, 2018.

* cited by examiner

LUGGAGE WHEEL ASSEMBLY

CROSS-REFERENCE TO RELATED APPLICATIONS

This application is the U.S. national phase of PCT/EP2019/052919, filed on Feb. 6, 2019, which claims the benefit of United Kingdom Patent Application Number 1801927.3, filed on Feb. 6, 2018, the entire disclosures of both of which are hereby incorporated by reference herein.

TECHNICAL FIELD

The present invention relates to a wheel assembly for an article of luggage.

BACKGROUND

In general, articles of luggage may comprise a wide variety of equipment that may be used to store, carry and/or convey equipment or belongings. For example, a suitcase may be one type of article of luggage that can be used to store a user's belongings for easy storage and transport. A suitcase may typically be equipped with wheels, a towing handle, a carry handle and an accessible opening to an interior of the suitcase.

There are a wide variety of wheels or casters for trolley suitcases, which enable such suitcases to travel or be "wheeled" along the ground by a user. Usually, suitcases are provided with two, four or eight wheels positioned at the bottom corners of the suitcase so as to provide a stable base. It is important for the wheels to be arranged on a level plane in order to provide a balance to the suitcase and allow the suitcase to easily travel along the ground when towed or pushed. This is particularly true for suitcases having a four-wheel configuration or eight-wheel configuration whereby wheeling involves pushing or pulling the suitcase whilst the suitcase is upright and all of the wheels are in contact with the ground.

Typically, a wheel may be provided as a part of a wheel assembly having several constituent parts, including, for example a wheel housing, a wheel fork and the wheel itself. The wheel may take a generally cylindrical form, for example, a radial disc-shape. Often, such wheels may be provided with either a single degree of rotation (i.e. the wheel can turn on its rotational axis but is otherwise fixed to lie and rotate along a single plane) or two degrees of rotation whereby the wheel can turn on its rotational axis and can also pivot about a second rotational axis that is orthogonal to the first rotational axis. The second rotational axis allows the suitcase to easily be manoeuvred in any direction along the ground without needing to rotate the entire suitcase. The wheel assemblies having a single degree of rotation are typically used for suitcases that have a two-wheel configuration. The wheel assemblies having two degrees of rotation are more commonly provided on suitcases having either a four-wheel configuration or an eight-wheel configuration so as to enable such suitcases to easily glide in any direction along the ground with all wheels in contact with the ground.

Naturally, suitcase wheels are required to be exposed (i.e. outwardly protrude from the body of the suitcase) in order to make contact with the ground, however an inherent issue with such exposure is that the wheels are prone to damage, particularly in transit where the wheels can be impacted from the side and receive "knocks" from external objects. Such knocks may damage the wheel assembly such that the second rotational axis is no longer aligned with a vertical plane. This may in turn cause the wheel to no longer be aligned along the same level plane as the other suitcase wheels. As a consequence, the suitcase may no longer be balanced when stood upright. In turn, this may cause the suitcase to easily tip and fall over, thus making it difficult for the suitcase to be stood upright (i.e. unassisted by the user) and wheeled.

A conventional wheel assembly having an "external" twin-fork clamp (i.e. that has two arms to clamp either side of the wheel) can mitigate some of the impact damage risk by acting as a guard or shield to the wheel. However, this only protects a small portion of the wheel leaving much of the remainder of the wheel exposed.

In addition to impact from external objects, suitcase wheels must also be able to withstand being dropped on the wheels from certain heights without sustaining any damage. In particular, suitcases typically go through vigorous testing during production, commonly known as "drop testing", whereby a loaded suitcase (i.e. with a predetermined weight) is dropped from several predefined heights so that it deliberately lands on the wheels. The testing is done to make sure that the wheels can withstand such drops without breaking or sustaining damage that might affect the performance of the suitcase. In this regard, the wheel assemblies are conventionally made of strong, rigid materials that can withstand such impact events.

However, whilst the rigid wheels may withstand the impact events of the drop testing, the consequence of using a rigid wheel construction is that a large proportion of the impact must then be absorbed by the suitcase body and the contents within. This may cause a mechanical or physical shock to the contents of the suitcase.

The conventional twin-fork clamp wheel assembly described above exacerbates this issue due to the clamping forces restricting the ability of the wheel to undergo an elastic deformation, and hence reducing any dampening effect that might be provided by the wheels.

Accordingly, there is a need for an improved wheel assembly construction that better mitigates the risk of impact damage and impact shock.

SUMMARY

According to one aspect of the present disclosure, there is provided a wheel assembly for an article of luggage. The wheel assembly comprises a central support element, a first wheel rotatably attached to the central support element and a second wheel rotatably attached to the central support element on an opposing side to the first wheel. The first wheel and the second wheel share a common axis of rotation. Each of the first wheel and the second wheel are substantially hemispherical in shape.

The hemispheric shape of the wheels acts to deflect any impacts from external objects, for example, during transit of an article of luggage that incorporates the wheel assembly. This is due to the curved external surface that acts to deflect the forces from external objects. This reduces the impact forces experienced by the wheel assembly and consequently mitigates the risk of direct damage to the wheel assembly and indirect damage to any associated article of luggage. For example, in the case of the article of luggage being an eight-wheel configuration suitcase, the risk of one of the wheel assemblies being accidently offset from its X or Y axis (i.e. corresponding to the two orthogonal axes of rotation) is mitigated, thus reducing the possibility of dislodging the wheel assembly from its alignment with the other wheel assemblies. This, in turn, reduces the possibility of the suitcase tipping and also reduces the possibility of a failing wheel assembly during wheeling (i.e. which would create drag for the suitcase and deteriorate the ability of the suitcase to be properly wheeled).

The use of a central support structure for attachment of the wheels means that the wheels can be maintained together (i.e. adjacent one another) in the appropriate parallel position along the common axis of rotation without requiring any complicated structures such as the traditional twin-fork clamp. As well as keeping the wheels together in the correct parallel arrangement, the central support structure means that the wheels are not impeded from elastic deformation and expansion (i.e. particularly in a lateral direction) if the wheel assembly were to fall from a height and land on the wheels unlike the conventional wheel assembly having the twin-fork clamp arrangement.

As described above, the use of a central support structure means that elastic deformation of the wheels is unimpeded. Additionally, the hemispherical shape of the wheels means that the contact area between the wheels and the impact surface (i.e. the ground) will increase on elastic deformation when compared to conventional cylindrical wheels. As a consequence, the wheels may transfer kinetic energy from the wheel assembly more effectively, thus dampening the vibrations experienced by the wheel assembly on impact and reducing the impact force experienced by the wheel assembly. This in turn reduces the likelihood of damage to the wheel assembly as well as the impact shock that might be experienced by an associated article of luggage and/or its contents.

The first wheel and the second wheel may each comprise an inner core and an outer tyre. The outer tyre may at least partially house the inner core. The outer tyre may be generally frusto-hemispherical in shape. The outer tyre may comprise an exterior surface, at least one portion of which is curved in three dimensions. The curved portion of the exterior surface may comprise a radius of curvature that takes a value that is selected from a range of 0.03 to 0.05 $mm^{-1}$. The exterior surface may comprise a flat portion having a predetermined width and a fixed radius as measured from the rotational axis. The predetermined width may take a value that is selected from a range of 3 to 15 mm. The fixed radius may take a value that is selected from a range of 20 to 30 mm. The outer tyre may comprise a cavity defined by an interior surface, the interior surface comprising a plurality of radial grooves.

As per the above, the hemispherical shape and associated curvature provides at least: (i) an impact deflection capability; and (ii) an ability to efficiently transfer kinetic energy from a drop-type impact to the impact surface due to elastic deformation. The flat portion of the exterior surface may provide a greater tread to the wheel assembly to increase friction and traction, thus enabling the wheel assembly to grip the surface upon which it is resting or travelling.

The inner core may be substantially frusto-hemispheric in shape. The inner core may comprise an external surface that is adapted to conform to an interior surface of the outer tyre. The external surface may comprise a plurality of radial ribs.

As the inner core is adapted to conform to the internal dimensions of the outer tyre, there is a snug fit between the two components such that relative movement is restricted. The radial ribs of the inner core may be adapted to engage the radial grooves of the outer tyre, which further inhibits relative movement (and in particular, relative rotational movement) between the inner core and the outer tyre. This means that energy may be conserved during travel of the wheel assembly.

The inner core may comprise a socket configured to enable attachment of the wheel to the central support structure in a rotatable manner.

The central support element may comprise a body portion and a connection portion. The body portion may be provided between the first wheel and the second wheel so as to engage the first wheel and the second wheel. The connection portion may allow connection of the wheel assembly to an article of luggage. The body portion may be substantially planar. The body portion may be substantially cylindrical in shape with a truncated section. The truncated section may be at the bottom of the body portion and may therefore be a particularly useful feature when an article of luggage that incorporates the wheel assembly is being wheeled along uneven surface. This is because it reduces the possibility of the central support element "catching" the uneven surface and creating a frictional drag.

The central support element may comprise a mechanical fastener provided along a central axis of the body portion. Both the first wheel and the second wheel may be rotatably connected to the central support element via only the mechanical fastener. In this regard, the wheels may not be directly supported by any other structural elements such as clamping arms used in conventional twin-fork wheel assemblies. Accordingly, lateral expansion (i.e. elastic deformation) of the wheels is not restricted. The central axis may be aligned with the common axis of rotation.

The central support element comprises a plurality of radial spokes. As well as reducing the material required to produce the central support element, the radial spokes may comprise a spring bias that enables the mechanical fastener to be maintained in position, but also allows a certain amount of flexing such that any impact to the wheel assembly may be dampened.

The wheel assembly may comprise a wheel housing. The central support element may be rotatably attached to the wheel housing and the wheel housing may be adapted for attachment to an article of luggage.

The first wheel and second wheel may comprise thermoplastic elastomer (TPE). TPEs, such as those materials comprising a mix of polymers (e.g. plastic and rubber), may have both thermoplastic and elastomeric properties. Furthermore, the shape of the thermoplastic elastomer may be easily produced, for example, by injection molding. The elastomeric properties mean that the material can undergo a temporary elastic deformation, thereby cushioning and damping an impact. TPE materials may also have a particular stiffness that allows rigidity of the wheel when there is no sudden impact force, thus enabling traction as well as abrasion resistance. Furthermore, TPE comprises impact absorption qualities and may thus provide an additional damping to vibrations to thereby further reduce impact shock. The hemispheric shape of the wheels means that more TPE may be provided compared to other conventional wheel shapes (i.e. cylindrical or disk-shaped wheels) and therefore impact shocks can be further attenuated. For example, the TPE may be a thermoplastic urethane (TPU) having a durometer value selected from a range of 70 A to 100 A.

The inner core may comprise polypropylene. Polypropylene provides rigidity to the wheel assembly so as to maintain the wheel shape. It also has a certain amount of flexibility, which reduces the possibility of fracture due to impact. This flexibility means that the inner core may also absorb impact shock and provide further damping effects.

The outer tyre may comprise thermoplastic elastomer. As above, TPE has impact absorption properties and may temporarily elastically deform on impact. In addition, TPE is relatively soft compared to other traditional materials used in luggage wheels such as polypropylene and nylon. The softness of TPE used for the tyres and provides vibration damping, which in turn decreases noise when the wheels are travelling along a surface.

The central support element may comprise nylon. Nylon is rigid and so allows the wheels to be provided in a fixed position with respect to an associated suitcase body. Nylon is also self-lubricating, which provides a smoother travel of the wheels (i.e. less frictional resistance between the central support element and the wheels).

According to another aspect of the present disclosure, there is provided an article of luggage comprising at least one wheel assembly and further comprising: at least one carry handle and a trolley handle assembly. The article of luggage may be a suitcase.

BRIEF DESCRIPTION OF THE DRAWINGS

Embodiments of the present disclosure will now be described, by way of example only, by reference to the accompanying drawings, in which.

DETAILED DESCRIPTION

Embodiments of the present disclosure generally relate to wheel assembly for an article of luggage having a twin hemispheric wheel configuration for mitigating impact damage to the wheel and any associated article of luggage, particularly during transit.

Embodiments of the present invention are described herein with reference to a suitcase, which is generally understood to be an article of luggage used to contain and transport a person's belongings. However, it will be appreciated that the inventive concept may be applied to any article of luggage and is not limited to use solely with suitcases. For example, the wheel assembly may be used with wheel-bags, wheeled duffels, wheeled backpacks and so forth. Furthermore, it is envisaged that the inventive concept may be used outside of the field of luggage for any apparatus that may use wheels for manoeuvring the apparatus by a human operator, for example, furniture, trolleys and so forth. The suitcase described herein is a so-called "soft" suitcase due to the suitcase body comprising a non-moulded material, which in this case is a fabric material. However, it will be appreciated that other types of suitcases may be used, such as "hard" suitcases that comprise any moulded material, plastics material or metal/metal-alloy material.

Figure 1A:
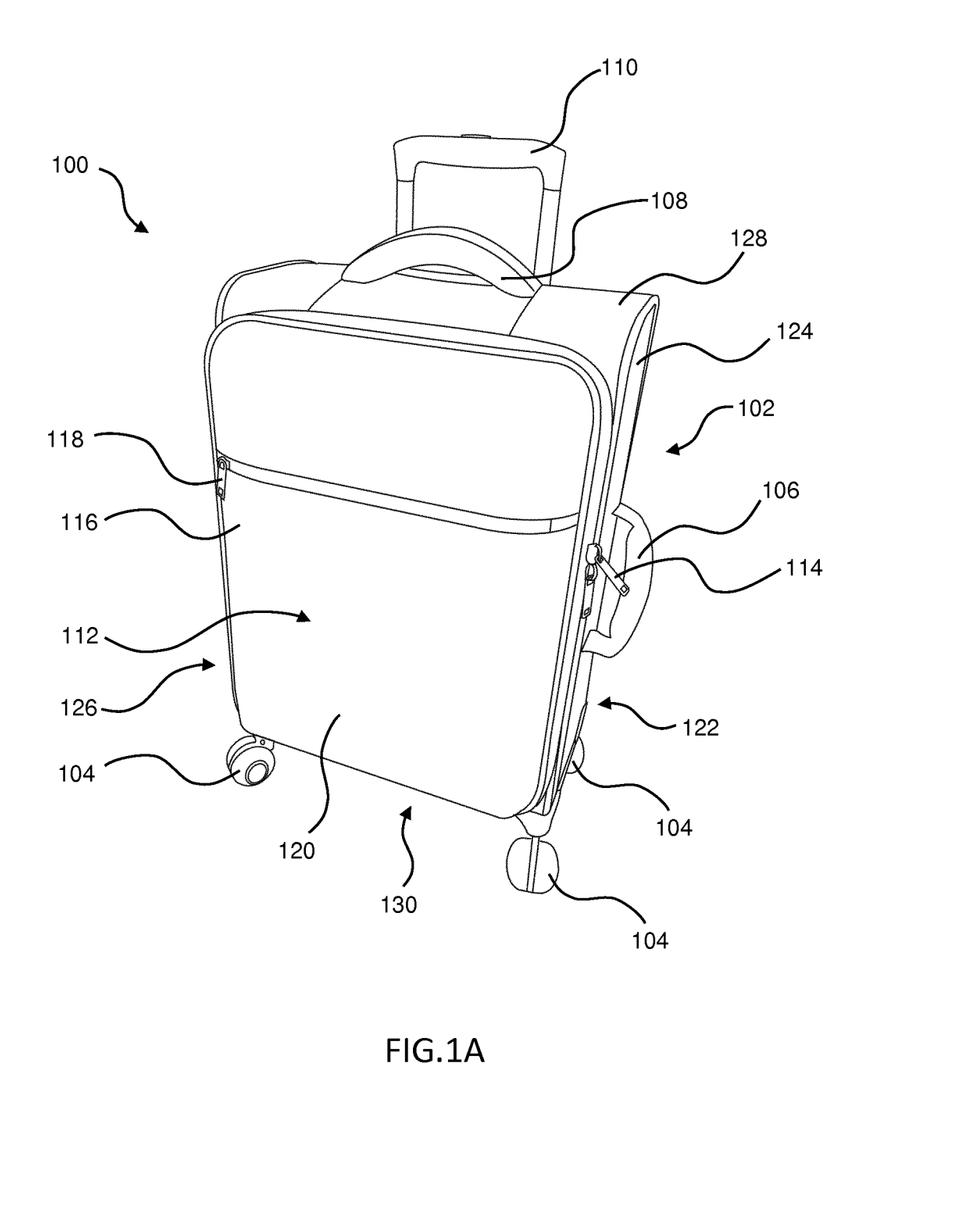
FIG. 1A is a front perspective view of a suitcase with wheels in accordance with an embodiment of the present disclosure.

FIG. 1A is a front perspective view of a soft suitcase 100. The suitcase 100 comprises a body 102, a plurality of wheel assemblies 104, a side carry handle 106, a top carry handle 108, a retractable trolley handle assembly 110, a lid section 112, a first zip arrangement 114 for enabling the lid section 112 to be opened and closed, a closable front pocket 116 and a second zip arrangement 118 for enabling the front pocket 116 to be opened and closed.

The body 102 of the suitcase is generally known as a "box-body" shape and is thus generally parallelepiped-shaped, having a cavity defined by six major exterior faces: a front face 120, a rear face 122, a first side face 124, a second side face 126, a top face 128 and a bottom face 130. In this example, the plurality of wheel assemblies 104 are arranged on the bottom face 130 of the suitcase at the four corners of the bottom face 130, the side carry handle 106 is provided on the first side face 124, the top carry handle 108 is provided on the top face 128, the retractable trolley handle assembly 110 extends parallel to the rear face 122 and through the top face 128, and the lid section 112 is provided on the front face 120 along with the front pocket 116. The lid section 112 is joined along at least a portion of one edge to the second side face 126 in order to form a hinge. The first zip arrangement 114 extends around the periphery of the lid section 112 and the periphery defined by the joining of the first side face 124, second side face 126, top face 128 and bottom face 130, but not the rear face 122. When the first zip arrangement 114 is in a closed configuration, the lid section 112 is fastened to the remainder of the suitcase body 102 so that the suitcase 100 is closed and any contents therein cannot be accessed. When the first zip arrangement 114 is in an open configuration, the suitcase 100 is opened so that any contents contained therein may be accessed.

Figure 1B:
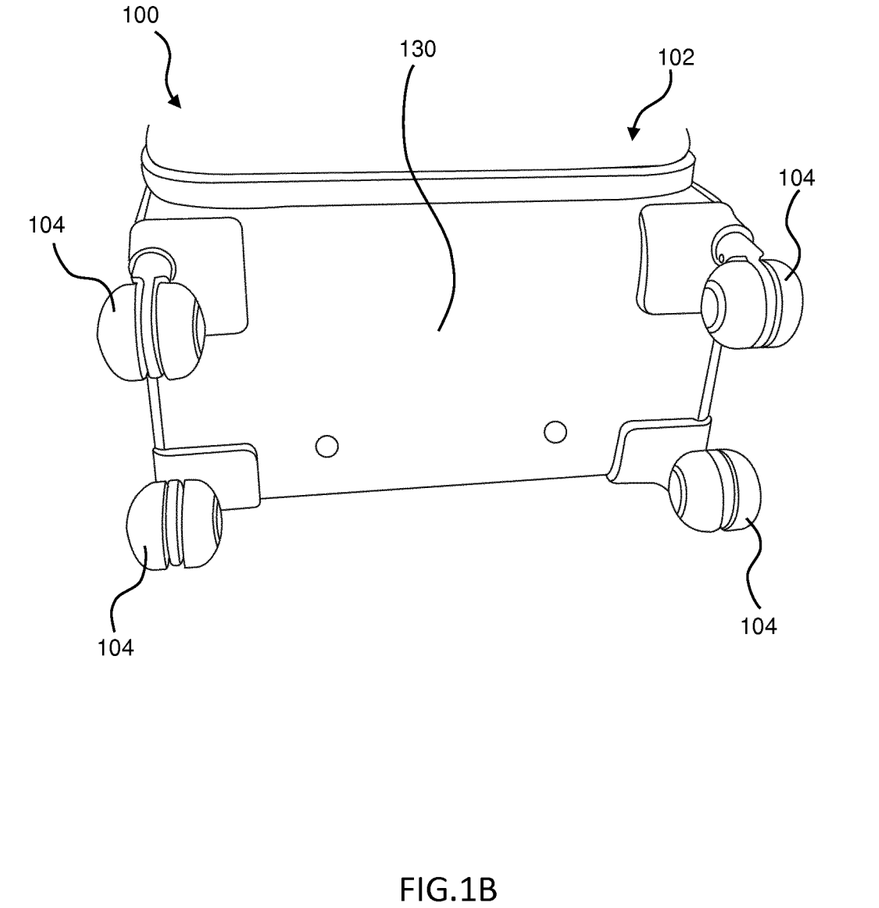
FIG. 1B is a bottom view of the suitcase of FIG. 1A.

FIG. 1B is a bottom view of the suitcase 100 and shows the bottom face 130 with a plurality of wheel assemblies 104 attached thereto. In this example, the suitcase 100 is of an eight-wheel configuration having four wheel assemblies 104, each wheel assembly 104 consisting of two wheels that are paired together. In particular, the four wheel assemblies 104 are arranged at the four corner extremities of the bottom face 130. The four wheel assemblies 104 have like dimensions and structure. This arrangement provides a strong lateral stability, ensuring that the suitcase 100 can be stood upright (i.e. with all wheels in contact with the ground) without any external supporting forces. The wheel assemblies 104 are aligned along a single plane such that, when the suitcase 100 is upright on a horizontal plane, the top face 128 and bottom face 130 are parallel to the horizontal plane, and the remaining faces are substantially vertical. This means that the centre of gravity of the suitcase 100 can be located as centrally as possible with respect to the bottom face 130, thereby further increasing the stability of the suitcase 100 and reducing the likelihood of tipping.

Figure 2A:
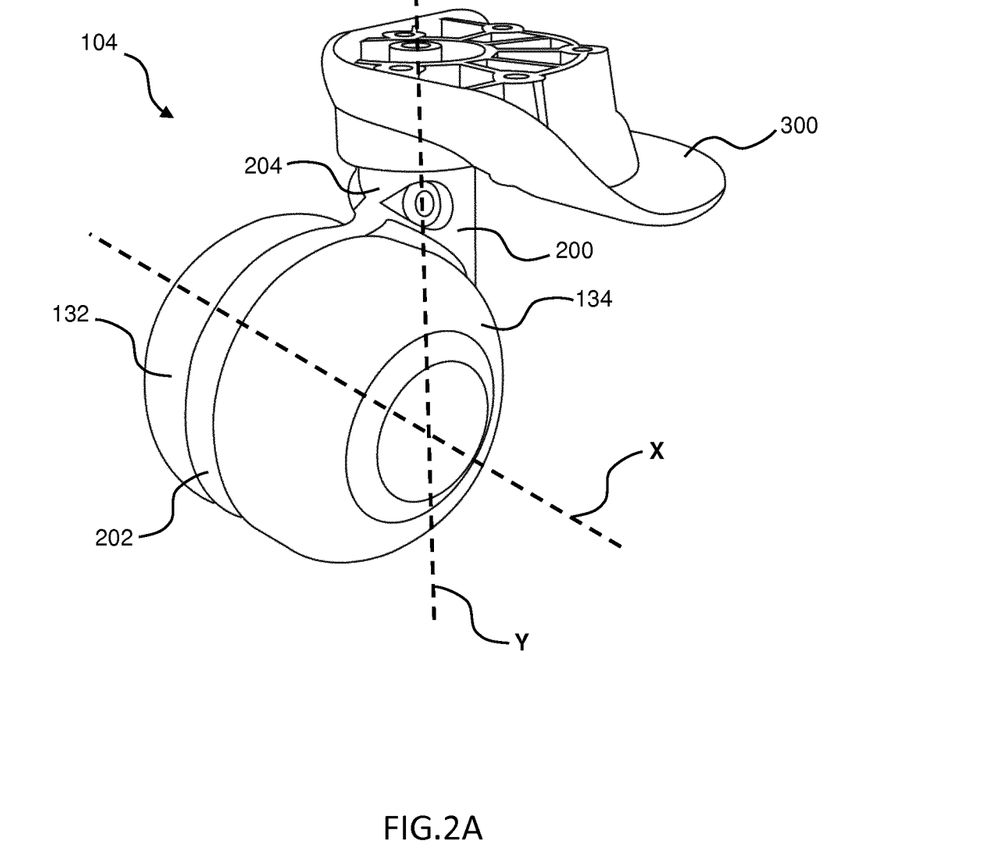
FIG. 2A is a front perspective view of the suitcase wheel of FIG. 1A.
Figure 2B:
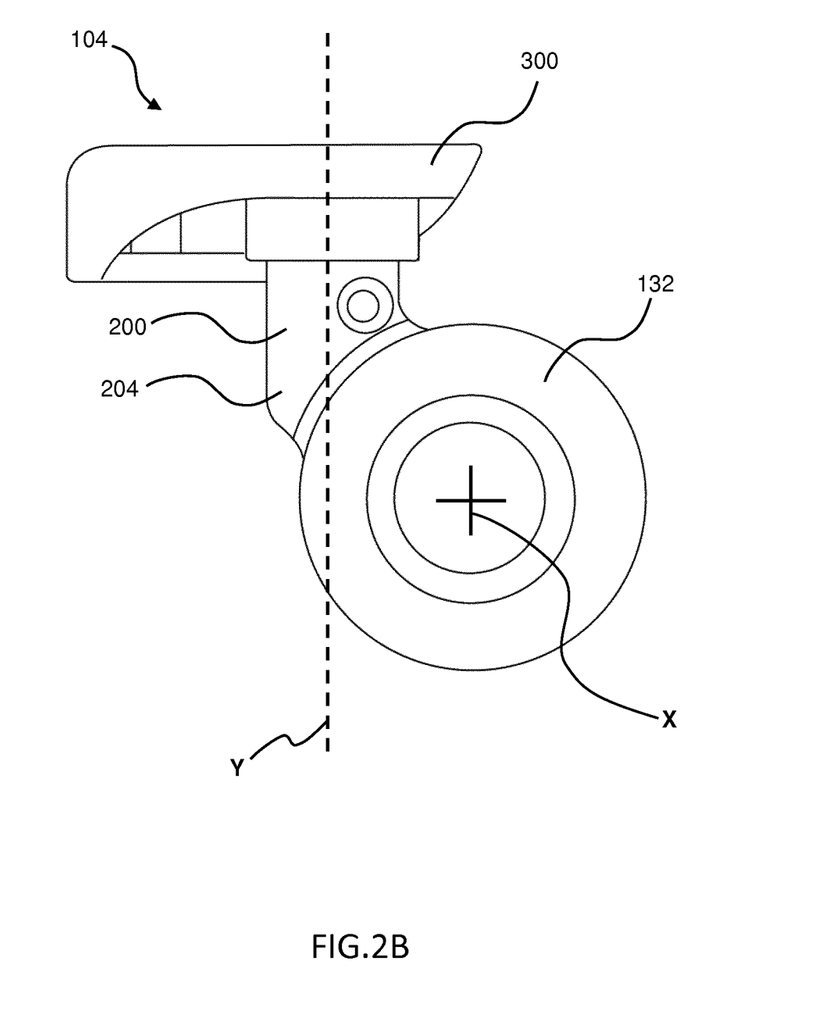
FIG. 2B is a side view of the suitcase wheel of FIG. 1A.
Figure 2C:
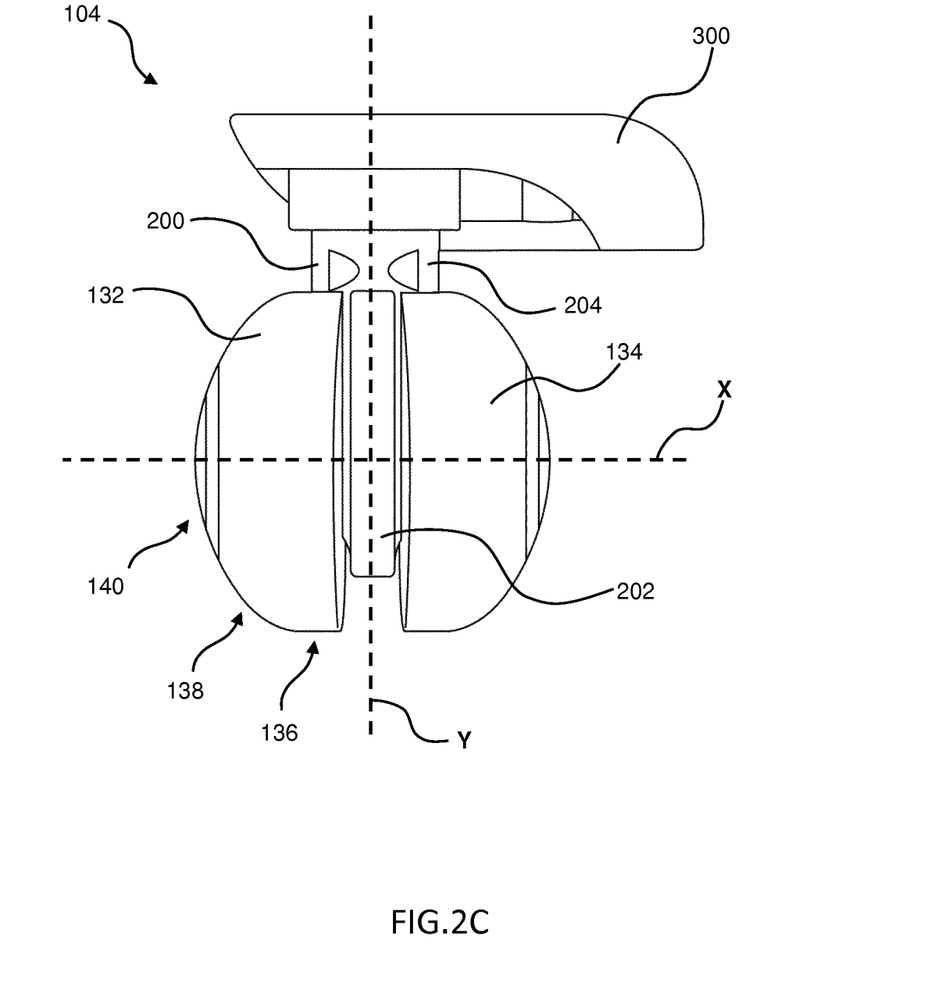
FIG. 2C is a front view of the suitcase wheel of FIG. 1A.

FIGS. 2A to 2C show an individual luggage wheel assembly 104 in more detail when assembled.

Figure 3:
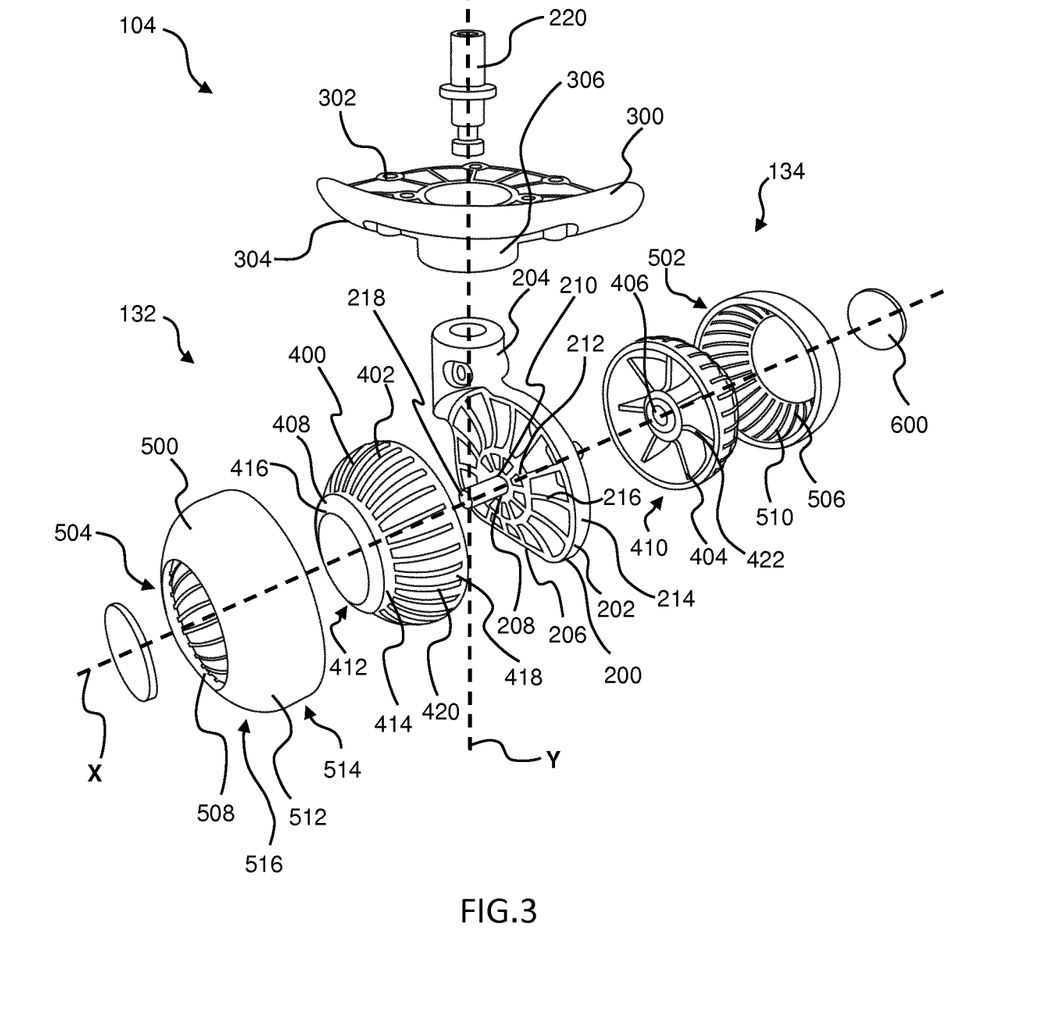
FIG. 3 is an exploded view of the suitcase wheel of FIG. 1A.

FIG. 3 is an exploded view of the individual luggage wheel assembly 104 showing its constituent parts prior to assembly.

The wheel assembly 104 in FIGS. 2A, 2B, 2C and 3 is shown independently of the suitcase 100, but is depicted as being upright as if the wheel assembly 104 were attached to the suitcase 100 and the suitcase 100 were to be positioned upright with the wheel assemblies 104 in contact with the ground.

Turning now to FIG. 2A, this figure is a front perspective view of the wheel assembly 104. The wheel assembly 104 comprises a first wheel 132, second wheel 134, a central support element 200 and a wheel housing 300. The first wheel 132 and a second wheel 134 are arranged in parallel about a central support element 200 and along a common rotational axis X. The first wheel 132 and the second wheel 134 are identical in shape and dimensions. The central support element 200 may sometimes be referred to a "wheel fork", but it will be appreciated that the central support element 200 of embodiments of the present disclosure is not fork-like in the sense that it does not have two arms/protruding limbs. The central support element 200 comprises a body portion 202 and a connection portion 204. The body portion 202 enables the first wheel 132 and second wheel 134 to be attached thereto. The connection portion 204 enables the central support element 200 to be connected to a wheel housing 300. The wheel housing 300 enables the wheel assembly 104 to be attached to the suitcase body 102.

The first and second wheels 132, 134 are each generally hemispheric in shape and are arranged in parallel (i.e. either side of the central support element 200) so that there is a line of symmetry between the wheels 132, 134. The symmetry means that the first and second wheels 132, 134 together appear to form a generally spherical or ball shape when viewed along the line of symmetry. The first wheel 132 and the second wheel 134 both have the same structure, size and shape, and each comprise a radial centre which is aligned with the common rotational axis X. As such, the first wheel 132 and second wheel 134 may freely rotate with respect to the common rotational axis X. Furthermore, as the first wheel 132 and second wheel 134 are identical in structure, size and shape, this means that the suitcase 100 to which the wheel assembly 104 is attached will remain stable when in an upright position (i.e. assuming that a stable wheelbase is provided, such as by using an eight-wheel configuration with each wheel assembly 104 located in a respective bottom corner of the suitcase).

The central support element 200 is connected to the wheel housing 300 such that it can pivot/rotate with respect to the wheel housing 300. More specifically, the central support element 200 is connected to the wheel housing 300 so that it may rotate with respect to a second rotational axis Y that is orthogonal to the first, common rotational axis X. The second rotational axis Y is offset from a centre point of the body portion 202.

As a consequence of having two orthogonal axes of rotation X, Y, the wheel assembly 104 may facilitate travel of an associated suitcase 100 in any direction along a given plane without necessarily needing to turn the suitcase 100 itself. The wheel assembly 104 is thereby provided with a three hundred and sixty degrees rotational ability.

FIG. 2B is a side view of the wheel assembly 104. It is a "side" view in the sense that the first rotational axis X is facing into the page and so the wheel assembly 104 is being viewed parallel to the direction of travel. The first wheel 132 comprises a circular cross section and has a radial centre that is aligned with the first rotational axis X. The radial distance from the radial centre to the outermost extremity may take a value selected from a range of 10 to 60 mm, and more preferably a range of 20 to 30 mm. Even more preferably, the radial distance may take a value of approximately 25 mm (i.e. wheel diameter of 50 mm at its largest cross-section).

As shown, the connection portion 204 of the central support element 200 is aligned with the second rotational axis Y. The second rotational axis Y is offset from the radial centres of the first wheel 132 and the second wheel 134 (and hence is offset from the first rotational axis X such that the axes do not intersect). This enables a better control when manoeuvring the suitcase compared to a wheel assembly having axes with a zero offset. This is because, with a zero offset, a low force is required in order to spin the wheels. Accordingly, when a person manoeuvres a suitcase over the ground, the wheels can easily spin due to the ground resistance, against the will of the person, thus making the travel of the suitcase difficult to control. In contrast, having a predetermined offset means that the wheels 132, 134 are less likely to accidentally turn due to ground/surface resistance. In this regard, the offset enables the operator of the suitcase to have better control over manoeuvrability of the suitcase.

FIG. 2C is a front view of the wheel assembly 104. It is a "front" view in the sense that the connection portion 204 of the central support element 200 is positioned towards the rear of the wheel assembly 104 such that the direction of travel would be orthogonal to the plane of the page. In this view, both the wheels 132, 134 and the central support element 200 (but not the wheel housing 300) share a line of symmetry that is aligned with the second rotational axis Y. In this figure, the first wheel 132 is on the left-hand side of the central support element 200 and the second wheel is on the right-hand side of the central support element.

The first wheel 132 comprises a first section 136, a middle section 138 and an end section 140. Whilst the first wheel 132 is described herein as having sections, this will be understood as being for the purpose of describing the side profile of the first wheel and therefore the term "section" does not necessarily refer to individual constituent parts of the first wheel 132. The first section 136 has a fixed width and its outer surface is kept at a constant radius from the radial centre/first rotational axis X (and thus the first section 136 is substantially cylindrical in shape). The fixed width of the first section 136 may take a value selected from the range of 2 to 40 mm, and more preferably 3 to 15 mm. Even more preferably, the fixed width may take a value of approximately 8 mm. The constant radius of the first section 136 may take a value selected from a range of 10 to 60 mm, and more preferably 20 to 30 mm. Even more preferably, the constant radius may take a value of about 25 mm. This constant radius is the largest radius of the first wheel 132. The middle section 138 also comprises a fixed width, however its outer surface is curved in a convex manner such that the radial distance between the outer surface and the first rotational axis X decreases the further the outer surface extends away from the first section 136. The fixed width of the middle section 138 may take a value selected from a range of 2 to 40 mm, and more preferably 5 to 15 mm. Even more preferably, the fixed width may take a value of about 8 mm. The radial distance of the middle section 138 may gradually decrease from the maximum radius until it reaches the end section 140. The middle section 138 may comprise a radius of curvature that has a value selected from a range of 0.01 to 0.1 $mm^{-1}$, and more preferably 0.03 to 0.05 $mm^{-1}$. Even more preferably, the radius of curvature may take a value of about 0.04 $mm^{-1}$. The end section 140 joins the middle section 138 and continues the radius of curvature such that the hemispherical shape of the first wheel 132 is completed and thus the outer surfaces of the first section 136, middle section 138 and end section 140 of the first wheel 132 are substantially continuous and uninterrupted. In exemplary embodiments of the present disclosure, the radius of curvature of the middle section 138 and end section 140 may take different values from one another. In alternative embodiments of the present disclosure the radii of curvature may take the same value. Additionally or alternatively, at least one of the middle section 138 and the end section 140 may comprise a radius of curvature having a changing value along the curved outer surface.

The body portion 202 of the central support element 200 is provided inbetween the first wheel 132 and the second wheel 134, and is provided with a narrow width so that the first wheel 132, second wheel 134 and central support element 200 together form a generally circular cross-section (although the figures have been modified to exaggerate some of the features and are not drawn to scale, and therefore may not provide a realistic appearance). For example, the width of the body portion 202 may take a value selected in a range of 2 to 20 mm, and more preferably 5 to 12 mm. Even more preferably, the width of the body portion 202 may be about 8 mm. The gaps between the body portion 202 and the first wheel 132 and the second wheel 134 are of the same width and may take a value selected in a range of 1 to 10 mm and more preferably 1 to 5 mm. Even more preferably, the gap may comprise a width of about 3 mm. The narrow width of the central support element 200 and narrow gaps means that the first wheel 132 and the second wheel 134 are kept close together. This allows the first wheel 132 and the second wheel 134 to have a smaller footprint (i.e. the maximum surface area of the two wheels 132, 134 including the space therebetween) so that they can work together (almost like a single wheel) and minimise any frictional drag (i.e. compared with if the wheels were to be spaced apart by a comparatively large distance, which would hinder manoeuvrability and create frictional drag when changing travel direction when wheeling an associated suitcase).

FIG. 3 is an exploded view of the wheel assembly 104. As the first and second wheels 132, 134 are identical in structure, like reference numerals will be used to describe the relevant constituent components.

Each of the first and second wheels 132, 134 comprise an inner core 400, an outer tyre 500 and an end cap 600.

The inner core 400 comprises a hollow main body 402, an internal frame 404 within the main body 402, a socket 406 defined by the internal frame 404, an annulus 408, a first open end 410 and an opposing second open end 412.

The main body 402 is a generally frusto-hemispherical shape having a predefined radius of curvature. In particular, the main body 402 comprises a tapering circular cross-section whose radius is largest at the first open end 410 and smallest at the second open end 412.

The annulus 408 or ring is provided at the second open end 412 so that it protrudes away from the first end 410. The annulus 408 comprises a lip 414 that is joined to a curved end surface 416. The curved end surface 416 comprises a tapering circular cross-section with a radius that decreases as the curved end surface 416 extends outwardly away from the first end 410.

An external surface 418 of the main body 402 comprises a plurality of radial ribs 420 that are regularly spaced around the external surface 418 and extend from the first open end 410 to the annulus 408 at the second open end 412. The radial ribs 420 protrude radially outwards away from the external surface 418.

The internal frame 404 comprises the socket 406, which is in the form of a hollow tube that is concentrically arranged within the inner core 400 and maintained in position by radial support elements 422 that extend between the socket 406 and the main body 402. The socket 406 is adapted for connection to the central support element 200 and thus allows the relevant wheel 132, 134 to be attached to the central support element 200. The radial support elements 422 retain the socket 406 in its concentric arrangement so that it remains in place along the first rotational axis X.

The outer tyre 500 is a hollow, generally frusto-hemispheric body having a first aperture 502 at one end and an opposing, second aperture 504 at the other end. The body of the outer tyre 500 comprises a tapering circular cross-section that generally decreases as the outer tyre 500 extends from the first aperture 502 to the second aperture 504.

The outer tyre 500 comprises an interior surface 506 that is adapted to conform to both the external surface 418 and annulus 408 of the inner core 400. This enables a snug, friction-fit to be provided between the outer tyre 500 and the inner core 400, ensuring that they may rotate together and not independently from one another. In this regard, the interior surface 506 has a generally frusto-hemispheric shape that can conform to the frusto-hemispheric shape of the inner core 400. The interior surface 506 also has an annular section 508 that is adapted to fit around the lip 414 of the annulus 408 of the inner core 400. Furthermore, the interior surface 506 comprises radial grooves 510 that are adapted and arranged to receive the radial ribs 420 of the inner core 400. The radial grooves 510 and radial ribs 420 further ensure that the inner core 400 and outer tyre 500 stay together when assembled and cannot rotate independently of one another.

The outer tyre 500 also comprises an exterior surface 512 having a flat portion 514 and a curved portion 516. The flat portion 514 is a ringed section having a generally flat surface that lies along a cylindrical plane that is at a fixed radial distance from the first rotational axis X. The flat portion 514 is at one extremity of the outer tyre 500 and defines the first aperture 502 through which the inner core 400 is received. The flat portion comprises a predetermined width that may take a value selected from the range of 3 to 15 mm, and preferably may take a value of 8 mm. The flat portion comprises a fixed radius from the rotational axis X. The fixed radius may take a value that is selected from a range of 10 to 60 mm, and more preferably 20 to 33 mm. Even more preferably, the fixed radius may take a value of approximately 25 mm. The curved portion 516 is joined to the flat portion 514 and has a tapering circular cross-section whereby the radius decreases as the curved portion 516 extends away from the flat portion 514. The curved portion 516 is curved in a convex manner. The curved portion 516 may be curved in three dimensions. The curved portion of the exterior surface may comprise a radius of curvature that takes a value that is selected from a range of 0.01 to 0.1 $mm^{-1}$, and more preferably 0.03 to 0.05 $mm^{-1}$. Even more preferably, the radius of curvature may take a value of approximately 0.04 $mm^{-1}$.

When the outer tyre 500 is placed around the inner core 400, the curved end surface 416 of the annulus 408 of the inner core 400 protrudes through the second aperture 504 of the outer tyre 500. The curvature of the curved end surface 416 of the inner core 400 may continue the curvature of the curved portion 516 of the outer tyre 500 so as to provide a substantially continuous surface when combined together. The radius of curvature of the curved end surface 416 may be substantially the same as the radius of curvature of the curved portion 516. Additionally or alternatively, the radius of curvature of the curved end surface 416 may comprise a different radius of curvature of the curved portion 516 but the same or a greater rate of change of the radius of curvature of the curved portion 516.

The end cap 600 is adapted to fit within the second open end 412 of the inner core 400. The end cap 600 comprises a curved outer surface that is adapted to continue the curvature of the curved end surface 416 and curved portion 516 so that, when combined together, the generally hemispheric shape is completed. In this regard, the radius of curvature of the end cap 600 may be substantially the same as the radius of curvature of the curved end surface 416. Additionally or alternatively, the radius of curvature of the end cap 600 may comprise a different radius of curvature of the curved end surface 416 but the same or a greater rate of change of the radius of curvature of the curved end surface 416.

Accordingly, the fully assembled first wheel 132 may comprise three different components that contribute to the generally hemispheric shape of the wheel.

As before, the second wheel 134 is identical in its construction to the first wheel 132 but is placed back-to-back with the first wheel 132 when the wheel assembly 104 is fully assembled so that there is symmetry between the wheels 132, 134. In this manner, the wheels 132, 134 together provided a generally spherical shape.

Turning now to the central support element 200, the central support element comprises the body portion 202 and the connection portion 204.

The body portion 202 is generally disc shaped with a truncated bottom section 206. The truncated bottom section 206 reduces the possibility of creating drag or friction when the wheel assembly 104 is travelling along an uneven surface because it would be held at a higher point above the surface compared to the bottom of the wheels 132, 134 and so is less likely to come in direct contact with the ground.

The disc shaped section of the body portion 202 has a comparable radius to the largest radius of the wheels 132, 134 with the exception of the truncated bottom section 206, which is a cutaway portion along a plane that is orthogonal to both the first rotational axis X and the second rotational axis Y. A through-hole 208 is provided at the radial centre of the disc shaped section of the body portion 202, which is aligned with the first rotational axis X. The body portion 202 comprises three concentrically arranged rings aligned in a single plane: a first inner ring 210 that defines the through-hole 208; a second inner ring 212 with a diameter that is larger than the first inner ring 210; and an outer ring 214 with the largest diameter out of the three rings. A plurality of radial spokes 216 are disposed between the first inner ring 210 and the second inner ring 212, and also between the second inner ring 212 and the outer ring 214. A mechanical fastener 218 is positioned within the through-hole 208 and extends in both directions along the first rotational axis X so as to enable engagement with the sockets 406 associated with the inner cores 400 of each respective wheel 132, 134. For example, the mechanical fastener 218 may be a rivet, a bolt, a screw or any element that allows the attachment of the wheels 132, 134 to the central support element 200. The wheels 132, 134 are attached to the central support element 200 in a manner that enables the wheels 132, 134 to rotate freely with respect to the central support element 200. For example, the mechanical fastener 218 may be fixed to the central support element 200 and the wheels 132, 134 may rotate with respect to the fixed mechanical fastener 218. Alternatively, the wheels 132, 134 may be fixed to the mechanical fastener 218 and the mechanical fastener 218 may be free to rotate with respect to the central support element 200. In a further alternative, the mechanical fastener 218 may not be fixedly attached to any one component but may instead be free to rotate with respect to either of the wheels 132, 134 and/or the central support element 200.

The connection portion 204 is in the form of a generally cylindrical adaptor that is aligned with the second rotational axis Y and which is configured to receive a second mechanical fastener 220.

The wheel housing 300 is a rigid body that enables the wheel assembly 104 to be attached to the suitcase 100 in a stable and rigid manner. In this regard, the wheel housing 300 comprises a top surface 302, a bottom surface 304 and a bore 306 through which the second mechanical fastener 220 is received. The top surface 302 is adapted to conform to the outer shape of the suitcase 100 at the relevant attachment point. The bottom surface 304 is adapted to follow the general external contour of the suitcase 100. The second mechanical fastener 220 may be a rivet, a bolt, a screw or any element that allows the attachment of the central support element 200 to the wheel housing 300. The central support element 200 is attached to the wheel housing 300 in a manner that enables the central support element 200 to rotate freely with respect to the wheel housing 300. For example, the second mechanical fastener 220 may be fixed to the wheel housing 300 and the central support element 200 may rotate with respect to the fixed mechanical fastener 220. Alternatively, the central support element 200 may be fixed to the second mechanical fastener 220 and the second mechanical fastener 220 may be free to rotate with respect to the wheel housing 300. In a further alternative, the second mechanical fastener 220 may not be fixedly attached to any one component but may instead be free to rotate with respect to either of the central support element 200 and/or the wheel housing 300.

To assemble the wheel assembly 104, the mechanical fastener 218 is positioned in the through-hole 208 of the central support element 200. The inner cores 400 of each respective wheel 132, 134 are then arranged either side of the central support element 200 so that the mechanical fastener 218 is received by the respective sockets 406 of each inner core 400. The inner cores 400 are arranged so that their largest diameters are closest to the central support element 200 and the smallest diameters are distal from the central support element 200.

The outer tyres 500 of each wheel 132, 134 are then placed around the respective inner cores 400 so that the radial grooves 510 of the outer tyres 500 are aligned with the radial ribs 420 of the inner core 400, thereby providing a friction-fit.

The respective end caps 600 are then positioned in the second apertures 504 of each outer tyre 500. The end caps 600 may be held in place by a friction push-fit arrangement although adhesive may also be used. Similarly, adhesive may be used to attach the outer tyres 500 to the respective inner cores 400.

The wheel housing 300 is positioned in place so that the bore 306 aligns with the connection portion 204 of the central support element 200 along the second rotational axis Y. The second mechanical fastener 220 is then inserted through the bore 306 to be received by the connection portion 204 to thereby attach the wheel housing 300 and central support element 200 together. In some embodiments, the second mechanical fastener 220 may also be used to attach the wheel housing 300 to the body 102 of the suitcase 100.

The wheel assembly 104 may be comprised of any one or combination of materials to optimise durability of the wheel assembly 104 (i.e. against wear and tear) as well as to provide dampening and shock absorption properties to the wheel assembly 104. For example, the central support element 200, inner core 400, outer tyre 500 and wheel housing 300 may comprise one or more of the following materials: nylon, polypropylene, polycarbonate, thermoplastic elastomer, acrylonitrile butadiene styrene, metal, metal alloy, plastics. In one embodiment of the present disclosure, the central support element 200 may comprise nylon, the inner core 400 may comprise polypropylene, the outer tyre 500 may comprise thermoplastic elastomer, the end cap 600 may comprise a combination of polypropylene and thermoplastic elastomer, the wheel housing 300 may comprise polypropylene, and the first and the second mechanical fasteners 218, 220 may comprise metal such as steel. The thermoplastic elastomer may comprise a mix of plastic and rubber, which consists of thermoplastic and elastomeric properties.

Figure 4A:
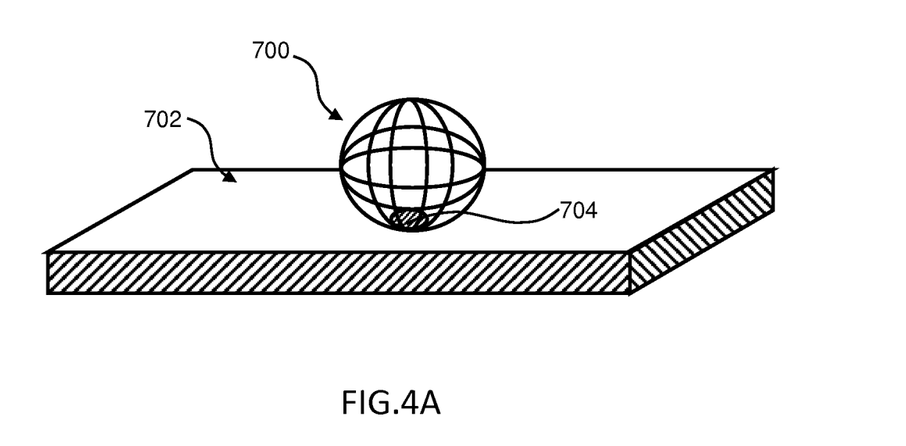
FIG. 4A is a schematic diagram depicting a sphere representing a wheel of the present disclosure that is in contact with the ground.
Figure 4B:
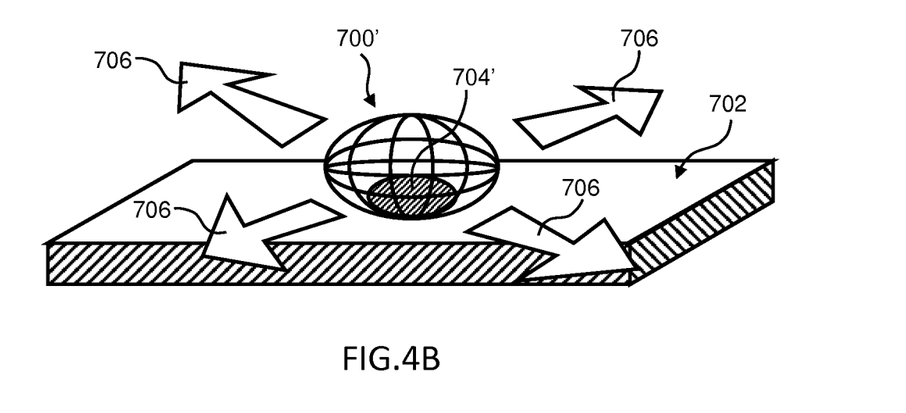
FIG. 4B is a schematic diagram showing the sphere of FIG. 4A undergoing a temporary elastic deformation.

FIGS. 4A and 4B are schematic representative diagrams showing how a wheel assembly 104 of the embodiments of the present disclosure (represented by a sphere 700 in these figures) may undergo temporary elastic deformation upon an impact event, for example, when a suitcase 100 comprising the wheel assemblies 104 is dropped on the wheel assemblies 104. In particular, FIG. 4A shows the sphere 700 resting on a horizontal surface 702. The sphere 700 is intended to approximate the shape of the wheel assembly 104 and is for illustration purposes only. The sphere 700 has a contact area 704 with the horizontal surface 702. The contact area 704 is where a portion of the external surface of the sphere 702 (i.e. representing the relevant portions of the exterior surfaces 512 of the outer tyres 500) is in contact with the horizontal surface 702 (i.e. which may be the ground or any other surface upon which the suitcase 100 is resting or travelling). This is the area where maximum friction is provided to enable the sphere to travel along the ground (or to stay still).

FIG. 4B shows the sphere 700 of FIG. 4A at a point in time where it has hit the horizontal surface after having been dropped from a predetermined height and has thereby undergone a temporary elastic deformation such that the shape has changed to an oblate spheroid 700'. In particular, the sphere 700 has transformed by experiencing a compression along the vertical axis and a corresponding radial expansion in the horizontal plane, as depicted by arrows 706 that represent the general direction of some of the expansion forces. As a consequence, the contact area 704 has increased to provide an enlarged contact area 704'. The enlarged contact area 704' means that a greater portion of the surface of the sphere 700/oblate spheroid 700' is in contact with the horizontal surface 702. This means that there is a larger surface area by which kinetic energy transfer may take place, for example, when compared with a cylindrical shape that only has curvature along a single axis. In turn, this means that the sphere 700 has a greater ability to transfer its kinetic energy to the horizontal surface 702 because of the elastic deformation.

Taking the analogy of FIGS. 4A and 4B to the wheel assembly 104 of embodiments of the present disclosure, it can be seen that the general hemispheric shape of the wheels 132, 134 enables a temporary elastic deformation upon surface impact that would increase the contact area between the wheels 132, 134 and the surface such that kinetic energy of the wheel assembly 104 (and associated suitcase 100) may be dissipated (i.e. transferred to the surface) more effectively when compared with traditional cylindrical wheels. In particular, the arrangement of a central support element 200 instead of a conventional twin-clamp fork means that no clamping force is present that inhibits elastic deformation. Furthermore, the thermoplastic elastomer material (or any other suitable soft, elastically deformable material) of the outer tyres 500 acts to cushion the impact, thereby providing effective impact absorption properties. The nature of the outer tyres 500 being generally hemispheric in shape means that more impact absorption material may be provided compared with if the wheel 132, 134 was to take a conventional cylindrical form.

Due to the shape of the general hemispheric shape of the wheels 132, 134 and the TPE material that is used, the wheel assembly 104 is provided with a relatively low coefficient of restitution (COR) (i.e. this a coefficient that takes into account relative velocity before impact and after impact and is made with reference to a rigid steel surface, in this instance).

The general hemispheric shape of the wheels 132, 134 also enables side-impacts to be deflected (i.e. impact from external objects from the sides of the wheels when the associated suitcase 100 is upright). The generally rigid inner core 400 and cap 600 (e.g. made from polypropylene or any other hard, rigid material) further increases the deflection ability and hence protection to the wheel assembly 104 and associated suitcase 100.

Whilst embodiments of the present disclosure have been described herein with reference to the accompanying exemplary figures, it will be appreciated that various modifications and alternatives may be envisaged without departing from the spirit and scope of the invention.

For example, whilst embodiments of the present disclosure described herein refer to a generally hemispheric inner core 400, it will be appreciated that other shapes of inner core 400 may be possible, whilst maintaining the impact deflection and impact absorption ability of the wheel assembly 104. More particularly, the inner core 400 may take a substantially cylindrical shape, cuboidal shape or any other structure. In this regard, the outer tyre 500 may comprise and interior surface 506 that conforms to whatever shape the inner core 400 may take.

Furthermore, whilst various values of radii of curvature have been provided herein, it will be appreciated that the curvature may, in some embodiments, have a changing radius value. Accordingly, it is not essential that a radius of curvature take a single, fixed value.

Embodiments of the present disclosure provide an example of an eight-wheel configuration suitcase 100, however it will be appreciated that any other wheel configuration would be possible. For example, one or more wheel assemblies 104 may be provided.

Embodiments of the present disclosure described herein discuss a wheel assembly 104 that includes at least an inner core 400, outer tyre 500 and end cap 600. In an alternative embodiment, the entire structure of a wheel may be made from a single material such that the wheel comprises a single component rather than three constituent components.

In embodiments of the present disclosure described herein, it is preferred that the outer tyre 500 comprise softer material than the inner core 400, however, in alternative embodiments, the inner core 400 may comprise softer material than the outer tyre 500 such that the majority of damping and shock absorption is provided by the inner core 400.

Embodiments of the present disclosure described herein with reference to FIG. 2C provide a first wheel 132 and a second wheel 134 having respective flat sections 134. In alternative embodiments, the wheels 132, 134 may have a continuous radius of curvature such that there are no flat sections provided.

The invention claimed is:

1. A wheel assembly for an article of luggage, the wheel assembly comprising:
    a central support element;
    a first wheel rotatably attached to the central support element;
    a second wheel rotatably attached to the central support element on an opposing side to the first wheel, wherein the first wheel and the second wheel share a common axis of rotation, wherein each of the first wheel and the second wheel are substantially hemispherical in shape, wherein the first wheel and the second wheel each comprise an inner core and an outer tyre, the outer tyre at least partially housing the inner core, wherein the inner core is substantially frusto-hemispheric in shape, wherein the inner core comprises an external surface that is adapted to conform to an interior surface of the outer tyre, and wherein the external surface comprises a plurality of radial ribs.

2. A wheel assembly according to claim 1, wherein the outer tyre is generally frusto-hemispherical in shape.

3. A wheel assembly according to claim 1, wherein the outer tyre comprises an exterior surface, at least one portion of which is curved in three dimensions.

4. A wheel assembly according to claim 3, wherein the curved portion of the exterior surface comprises a radius of curvature that takes a value that is selected from a range of 0.03 to 0.05 mm$^{-1}$.

5. A wheel assembly according to claim 3, wherein the exterior surface comprises a flat portion having a predetermined width and a fixed radius.

6. A wheel assembly according to claim 5, wherein the predetermined width takes a value that is selected from a range of 3 to 15 mm.

7. A wheel assembly according to claim 5, wherein the fixed radius takes a value that is selected from a range of 20 to 30 mm.

8. A wheel assembly according to claim 1, wherein the outer tyre comprises a cavity defined by an interior surface, the interior surface comprising a plurality of radial grooves.

9. A wheel assembly according to claim 1, wherein the inner core comprises a socket configured to enable attachment of the wheel to the central support element in a rotatable manner.

10. A wheel assembly according to claim 1, wherein the central support element comprises a body portion and a connection portion, the body portion being provided between the first wheel and the second wheel so as to engage the first wheel and the second wheel, wherein the connection portion is configured to allow connection of the wheel assembly to an article of luggage.

11. A wheel assembly according to claim 10, wherein the body portion is substantially planar.

12. A wheel assembly according to claim 10, wherein the body portion is substantially cylindrical in shape with a truncated section.

13. A wheel assembly according to claim 10, wherein the central support element comprises a mechanical fastener that is provided along a central axis of the body portion and both the first wheel and the second wheel are rotatably connected to the central support element via only the mechanical fastener, wherein the central axis is aligned with the common axis of rotation.

14. A wheel assembly according to claim 10, wherein the central support element comprises a plurality of radial spokes.

15. A wheel assembly according to claim 1, comprising a wheel housing, wherein the central support element is rotatably attached to the wheel housing and the wheel housing is adapted for attachment to an article of luggage.

16. A wheel assembly according to claim 1, wherein the first wheel and the second wheel each comprise thermoplastic elastomer.

17. A wheel assembly according to claim 1, wherein the inner core comprises polypropylene and the outer tyre comprises thermoplastic elastomer.

18. A wheel assembly according to claim 1, wherein the central support element comprises nylon.

19. An article of luggage comprising at least one wheel assembly according to claim 1 and further comprising: at least one carry handle and a trolley handle assembly.

20. A wheel assembly for an article of luggage, the wheel assembly comprising:
a central support element;
a first wheel rotatably attached to the central support element;
a second wheel rotatably attached to the central support element on an opposing side to the first wheel,
wherein the first wheel and the second wheel share a common axis of rotation,
wherein each of the first wheel and the second wheel are substantially hemispherical in shape,
wherein the first wheel and the second wheel each comprise an inner core and an outer tyre, the outer tyre at least partially housing the inner core, and
wherein the outer tyre comprises a cavity defined by an interior surface, the interior surface comprising a plurality of radial grooves.

21. A wheel assembly for an article of luggage, the wheel assembly comprising:
a central support element;
a first wheel rotatably attached to the central support element;
a second wheel rotatably attached to the central support element on an opposing side to the first wheel,
wherein the first wheel and the second wheel share a common axis of rotation,
wherein each of the first wheel and the second wheel are substantially hemispherical in shape,
wherein the central support element comprises a body portion and a connection portion, the body portion being provided between the first wheel and the second wheel so as to engage the first wheel and the second wheel, wherein the connection portion is configured to allow connection of the wheel assembly to an article of luggage, and
wherein the body portion is substantially cylindrical in shape with a truncated section.

* * * * *